(12) United States Patent
Kobayashi et al.

(10) Patent No.: US 8,090,004 B2
(45) Date of Patent: Jan. 3, 2012

(54) SPECTRUM SPREAD COMMUNICATION METHOD AND SYSTEM USING VERY WEAK POWER, AND HIGH FREQUENCY RADIO APPARATUS

(75) Inventors: Kaoru Kobayashi, Saitama (JP); Nobuo Tsukamoto, Tokyo (JP)

(73) Assignee: Nihon Dempa Kogyo Co., Ltd., Tokyo (JP)

( * ) Notice: Subject to any disclaimer, the term of this patent is extended or adjusted under 35 U.S.C. 154(b) by 726 days.

(21) Appl. No.: 11/817,462

(22) PCT Filed: Mar. 2, 2006

(86) PCT No.: PCT/JP2006/304523
§ 371 (c)(1),
(2), (4) Date: Nov. 7, 2008

(87) PCT Pub. No.: WO2006/093332
PCT Pub. Date: Sep. 8, 2006

(65) Prior Publication Data
US 2009/0207889 A1 Aug. 20, 2009

(30) Foreign Application Priority Data
Mar. 3, 2005 (JP) .................................. 2005-059348

(51) Int. Cl.
*H04B 1/707* (2011.01)
(52) U.S. Cl. ........ 375/141; 375/260; 375/272; 375/285; 375/267; 375/343; 375/367; 375/146; 375/147; 375/149; 375/150

(58) Field of Classification Search ............... 375/141, 375/260, 272, 285, 343, 367; 370/203, 208, 370/209, 320, 335, 342, 441, 479; 327/164
See application file for complete search history.

(56) References Cited

U.S. PATENT DOCUMENTS
6,307,840 B1 * 10/2001 Wheatley et al. ............. 370/252
2006/0233225 A1 * 10/2006 Omoto .......................... 375/149

FOREIGN PATENT DOCUMENTS
| JP | 10-056401 | 2/1998 |
| JP | 11-017651 | 1/1999 |
| JP | 2001-021637 | 1/2001 |
| JP | 2003-169369 | 6/2003 |
| JP | 2004-135247 | 4/2004 |

* cited by examiner

Primary Examiner — Dhaval Patel
(74) Attorney, Agent, or Firm — Ingrassia Fisher & Lorenz, P.C.

(57) ABSTRACT

Provided is a high frequency radio apparatus for correcting a frequency of a carrier of the own apparatus in accordance with a frequency of a reception carrier when performing spread spectrum communication using very weak power. A carrier demodulating part demodulates a spread code received from a communication counterpart radio apparatus by using default carrier data, and sends the demodulated spread code to a synchronization timing detecting part. When the synchronization timing detecting part detects the spread code from the carrier demodulated data, a carrier frequency deviation detecting part performs a frequency analysis of the spread code to detect a deviation amount of the carrier frequency. A carrier data generating part generates corrected carrier data based on the detected deviation amount. A DBPSK modulating part uses the corrected carrier data to perform data transmission to the communication counterpart radio apparatus.

13 Claims, 12 Drawing Sheets

SPECTRUM SPREAD COMMUNICATION METHOD AND SYSTEM USING VERY WEAK POWER, AND HIGH FREQUENCY RADIO APPARATUS

CROSS-REFERENCE TO RELATED APPLICATIONS

This application is a U.S. National-Stage entry under 35 U.S.C. §371 based on International Application No. PCT/JP2006/304523, filed Mar. 2, 2006, and which claims priority to Japanese Application No. JP 2005-059348, filed Mar. 3, 2005.

TECHNICAL FIELD

The present invention relates to a spread spectrum communication method and system for performing transmission/reception of data by use of very weak power, and to a high frequency radio apparatus.

BACKGROUND ART

A frequency of a carrier in a high frequency radio apparatus often varies depending on an ambient temperature, individual deviations of components, secular changes, and the like. As a method of detecting a degree of deviation of a frequency of a received carrier from a frequency of an own carrier in such cases, there is conventionally known a method of detecting a phase change point by counting a frequency component of a reception IF (IF stands for an intermediate frequency signal, the same applies to the following description) from a radio part including an antenna using a high-speed clock. In addition, there is also known a method of calculating a frequency deviation amount by performing delay detection on a received carrier and performing a geometric process of a complex baseband signal after the delay detection.

With the former method, an extremely-high-speed count clock is required in order to detect the phase change point of the reception IF. Therefore, current consumption of an entire communication system inevitably increases.

In the case of the latter method, a detection range of the frequency deviation amount is extremely narrow, which leads to a necessity for a local oscillator whose frequency accuracy is extremely high. In other words, the frequency deviation amount obtained from the geometric process of the complex baseband signal is limited to a range of ½ of an absolute value of a symbol rate even by a BPSK modulation/demodulation method necessarily capable of detecting a wide range of a frequency deviation amount. Therefore, as the number of values processed by the modulation/demodulation method increases as in the case of QPSK or QAM, the detection range is significantly narrowed and in the case of a low transmission rate system, higher local oscillation frequency accuracy is required. Consequently, when spread spectrum communication using very weak power is performed, it is impossible to adopt the conventional techniques.

There is also a method of adjusting a local oscillation frequency by setting correction data in a frequency synthesizer. However, such a method requires use of an expensive frequency synthesizer, which hinders miniaturization of a high frequency radio apparatus and also incurs an increase in cost of the entire communication system.

An object of the present invention is to provide a communication method by which it is possible to cope with a frequency deviation of a received carrier, which has been the conventional problem in a high frequency ratio apparatus, at low cost and to readily realize spread spectrum communication that excels in communication quality even with very weak power that is not a subject of regulation by law at low cost, and a high frequency radio apparatus that is suited for implementation of the method.

SUMMARY OF THE INVENTION

The present invention provides a spread spectrum communication method using very weak power, for solving the problems described above.

According to the present invention, there is provided a spread spectrum communication method using very weak power, in which one of a pair of high frequency radio apparatuses that communicate with each other through spread spectrum communication by use of the very weak power that is not a subject of regulation by law is set as a master unit and the other one of the pair is set as a slave unit, the spread spectrum communication method including the steps of: transmitting, by the slave unit, a spread code allocated to the slave unit to the master unit at an intermittent communication timing determined in advance; detecting, by the master unit, a difference between a carrier frequency of the slave unit and a carrier frequency of the master unit by performing a frequency analysis of a signal component included in reception data when receiving the spread code from the slave unit, correcting the carrier frequency of the master unit so that the detected difference is reduced, and transmitting a spread code allocated to the master unit to the slave unit at an intermittent communication timing determined based on a reception timing of the spread code from the slave unit; and judging, by each of the master unit and the slave unit, that there is a correlation when a correlation value level of the reception data at the time of reception of the spread code from the other one of the master unit and the slave unit is greater than a threshold value determined in advance, and establishing communication synchronization, in which only the spread code is exchanged until the communication synchronization is established between the master unit and the slave unit.

According to this method, even when accuracy of carrier generation by the slave unit is low and the carrier frequency varies or even when the carrier frequency of the master unit and the carrier frequency of the slave unit differ from each other, for instance, communication is performed by correcting the carrier frequency of the master unit on a master unit side, so it is possible to perform the spread spectrum communication with ease even without using an expensive component or the like.

The frequency analysis is preferably a fast Fourier transform process performed on data obtained by inversely spreading the spread code. Thus, the conventional problem concerning the high-speed clock is solved.

When the communication with the slave unit is continued, it is sufficient that the correction of the carrier frequency is made only at the start. Thus, the spread spectrum communication method further desirably includes obtaining, by the master unit, until the synchronization is established between the master unit and the slave unit, carrier demodulated data by performing carrier demodulation on the reception data using a carrier before the correction, performing delay detection on the carrier demodulated data, and performing an inverse spread process based on the data that has been subjected to the delay detection and a predetermined code obtained by a process corresponding to the delay detection, and after the synchronization is established, stopping input of the code obtained by the process corresponding to the delay detection and skipping the delay detection before the inverse spread process.

The spread spectrum communication method may further include causing, by each of the master unit and the slave unit, a communication counterpart side to establish the communication synchronization by transmitting the spread code allocated to the own unit by only a section corresponding to one cycle. Further, the spread spectrum communication method further includes determining, by each of the master unit and the slave unit, after the communication synchronization is established, whether the reception data sent from the communication counterpart side is data only for synchronization holding or application data sent after the synchronization holding by maintaining a transmission section for performing transmission in a section corresponding to one cycle of the spread code and maintaining a reception section for performing reception in a section corresponding to "two cycles of the spread code+α". Here, "α" is a time required for the determination.

Each of the master unit and the slave unit detects a correlation value for each cycle of the spread code with respect to the reception data from the communication counterpart side, elongates, when the detected correlation value is higher than a predetermined value, the reception section by one cycle of the spread code at a time based on the judgment that the data is application data, and stops the reception in the reception section in which a correlation with a previous cycle has become lower than the predetermined value. With this construction, it becomes unnecessary to secure a long section for the application data in advance, thereby enabling efficient communication.

The present invention also provides a high frequency radio apparatus that is suited for implementation of the spread spectrum communication method described above. The high frequency radio apparatus includes receiving means for receiving a signal having very weak power, which is not a subject of regulation by law, from a communication counterpart radio apparatus, difference detecting means for detecting a difference of a carrier frequency of itself from a carrier frequency of the signal received by the receiving means, carrier frequency correcting means for correcting the carrier frequency of itself based on the difference detected by the difference detecting means so that the carrier frequency approaches the carrier frequency of the received signal, and transmitting means for transmitting predetermined transmission data to the communication counterpart radio apparatus with a carrier whose frequency has been corrected by the carrier frequency correcting means serving as a medium.

In the high frequency radio apparatus, the difference detecting means is constructed to: include, for example, a synchronization timing detecting part for detecting a synchronization signal included in carrier demodulated data obtained by demodulating the received signal using default carrier data; and detect the difference by analyzing a frequency component of the synchronization signal detected by the synchronization timing detecting part. In the high frequency radio apparatus, the synchronization signal is, for example, a spread code that is unique to the communication counterpart radio apparatus, which is transmitted by only one cycle for synchronization establishment and synchronization holding.

As described above, the correction of the carrier frequency is not necessarily required after the synchronization is established. Therefore, the synchronization timing detecting part is constructed to, for instance, selectively form a first circuit for delay-detecting the carrier demodulated data and inversely spreading the delay-detected data using a differential code obtained through a delay detection process of a spread code allocated for an inverse spread process in advance, until the synchronization with the communication counterpart radio apparatus is established, and a second circuit for inversely spreading the carrier demodulated data while skipping the delay detection after the synchronization with the communication counterpart radio apparatus is established.

Specifically, in the high frequency radio apparatus, wherein the difference detecting means further includes: a memory of a FIFO type for saving a part of the carrier demodulated data corresponding to a predetermined length during an operation of the synchronization establishment; a control circuit for holding, when the reception data sent from the communication counterpart radio apparatus is detected by the synchronization timing detecting part, a part of the reception data in the memory; an inverse spread process circuit for performing the inverse spread process on the held reception data; and a detecting circuit for deriving a peak value of the data after subjecting the data that has undergone the inverse spread process by the inverse spread process circuit to a fast Fourier transform process, and detecting the difference in the data based on the derived peak value.

Further, in the high frequency radio apparatus, the transmitting means includes: a differential coding circuit for performing differential coding of the transmission data; a spread modulating part for spread-modulating a spread code allocated to itself using the transmission data that has been subjected to the differential coding by the differential coding circuit; a digital modulating circuit for digitally modulating the data spread-modulated by the spread modulating part; and a D/A converting circuit for converting the digitally modulated data into analog data. The transmitting means constructed as described above has an advantage in that a circuit construction in constructing the circuits using logical gate circuits is significantly simplified.

Further, the present invention provides a spread spectrum communication system using very weak power, including a pair of high frequency radio apparatuses that communicate with each other through spread spectrum communication by use of the very weak power that is not a subject of regulation by law, one of the pair being set as a master unit and the other one of the pair being set as a slave unit.

In the spread spectrum communication system, the slave unit includes communication means for transmitting a spread code B allocated to the slave unit to the master unit at an intermittent communication timing determined in advance, and waiting for a spread code A from the master unit; the master unit includes: detecting means for detecting a difference between a carrier frequency of the slave unit and a carrier frequency of the master unit by performing a frequency analysis of a signal component included in reception data when receiving the spread code B from the slave unit; carrier frequency correcting means for correcting the carrier frequency of the master unit so that the difference detected by the detecting means is reduced; and transmitting means for transmitting the spread code A allocated to the master unit to the slave unit at an intermittent communication timing determined based on a reception timing of the spread code B from the slave unit with a carrier whose frequency has been corrected by the carrier frequency correcting means serving as a medium; and each of the master unit and the slave unit includes synchronization establishment means for judging, when a correlation value level of the reception data at the time of reception of the spread code from the other one of the master unit and the slave unit is greater than a threshold value determined in advance, that there is a correlation, and establishing communication synchronization.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Hereinafter, an embodiment of the present invention will be described with reference to the accompanying drawings. In this embodiment, an example of a communication system will be described, in which spread spectrum communication using very weak power that is not a subject of regulation by law is performed between a high frequency radio apparatus (master unit) installed on a vehicle and a high frequency radio apparatus (slave unit) carried by a user with a carrier (carrier wave) having the very weak power that is not a subject of regulation by law as the medium.

(Overview of Spread Spectrum Communication)

Figure 1:
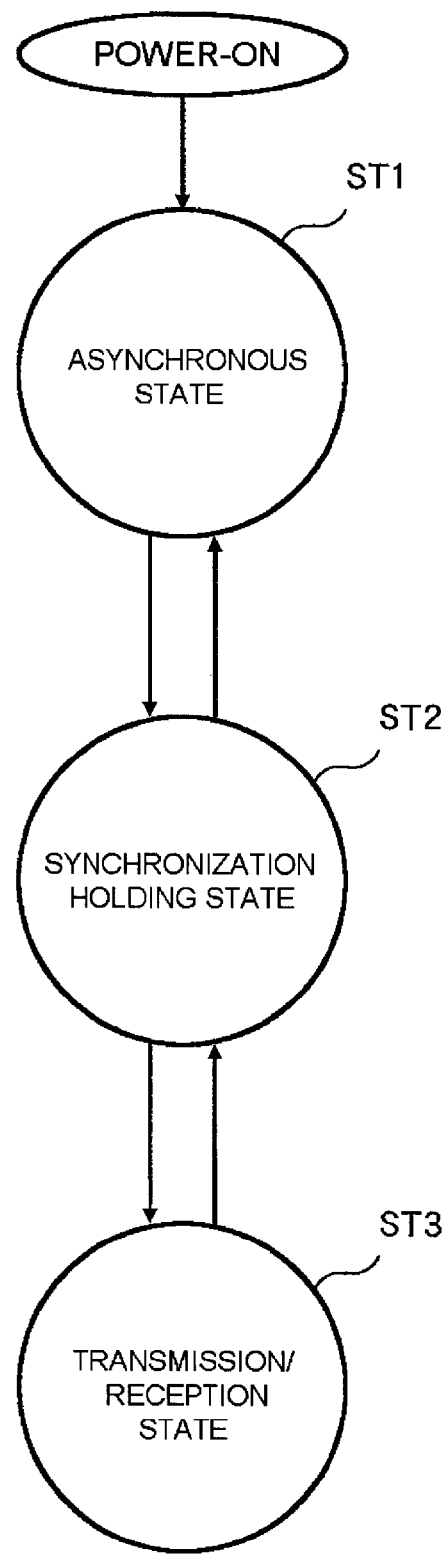
FIG. 1 is a state transition diagram of a high frequency radio apparatus (master unit or slave unit) in a communication system according to an embodiment of the present invention.
Figure 2:
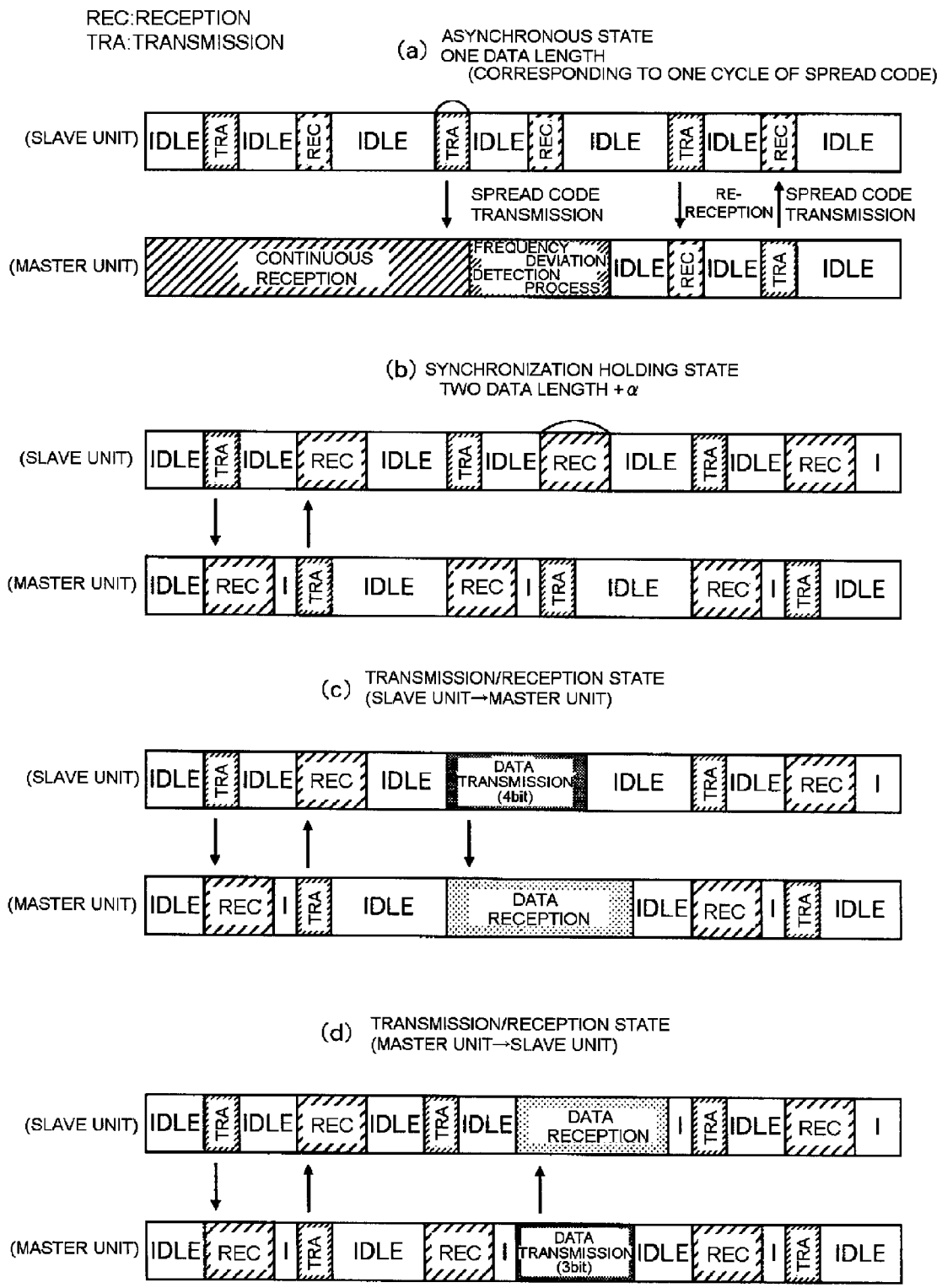
FIGS. 2 (a)-(d) are explanatory diagrams of operation timings of the master unit and the slave unit under an asynchronous state, a synchronization holding state, and a transmission/reception state.

First, an overview of spread spectrum communication according to this embodiment which is performed between the master unit and the slave unit will be described with reference to FIGS. 1 and 2. FIG. 1 is a communication state transition diagram of the slave unit (or the master unit) and FIGS. 2A to 2D are transmission/reception timing diagrams of the master unit and the slave unit under respective statuses.

In FIGS. 2A to 2D, "IDLE" indicates a section that is not used for transmission/reception, "TRANSMISSION" indicates a transmission section, and "RECEPTION" indicates a reception section. As is apparent from the figures, in the communication system in this embodiment, bidirectional communication is performed between the master unit and the slave unit at each predetermined intermittent communication timing. In this case, a spread code used by the master unit and a spread code used by the slave unit need to be different from each other. In this embodiment, for ease of explanation, the spread code of the master unit is given a reference symbol "A" and the spread code of the slave unit is given a reference symbol "B".

As shown in FIG. 1, there are three communication statuses (states) of an asynchronous state ST1, a synchronization holding state ST2, and a transmission/reception state. Overviews of those states will be described below.

(Asynchronous State ST1)

The asynchronous state ST1 is a so-called "asynchronous" status in which the master unit or the slave unit has just been powered on inside a communication area or exists outside a communication area. Under this status, between the master unit and the slave unit, synchronization of communication is not yet established. Under this asynchronous state ST1, as shown in FIG. 2A, the slave unit transmits the spread code B allocated to itself at an intermittent communication timing determined in advance and checks whether the spread code A allocated to the master unit is sent after a fixed interval. In other words, the slave unit enters into an intermittent transmission/reception status. A transmission section has one data length, in other words, a length corresponding to one cycle of the spread code. A time between the transmission section and a reception section and a time between the reception section and the next transmission section are each referred to as the "guard time". It is possible to set a length of this guard time at random.

The master unit waits for the spread code B from the slave unit under a continuous reception status. When receiving the spread code B from the slave unit, the master unit transmits the spread code A allocated to itself to the slave unit. Note that an arbitrary guard time is also set for the master unit between the transmission section and the reception section.

The master unit also determines the intermittent communication timing by receiving the spread code B from the slave unit and further performs a carrier frequency deviation detection process for detecting a degree of deviation of the carrier frequency of the slave unit from the carrier frequency of itself based on a reception signal component of the spread code B and corrects the carrier frequency of itself in accordance with the detected deviation amount. Accordingly, in order to improve frequency accuracy and a temperature characteristic, it becomes possible for the slave unit to use an inexpensive local oscillator instead of using components such as a frequency synthesizer and TCXO.

Each of the master unit and the slave unit also performs correlation value confirmation (detection) in order to judge whether the spread code of the other one of the master unit and the slave unit is received. The correlation value confirmation by the master unit is performed when the master unit is under the continuous reception status. On the other hand, the correlation value confirmation by the slave unit is performed at the time of intermittent reception. Each of the master unit and the slave unit judges, when a correlation value level of reception data expressing the spread code is greater than a threshold value determined in advance, that there is a correlation, in other words, the reception data (spread code) is received, and transits to the synchronization holding state.

By transmitting only the spread codes A and B until the communication synchronization is established between the master unit and the slave unit in this manner, a reduction of current consumption is achieved.

(Synchronization Holding State ST2)

The synchronization holding state ST2 is a status under which recognition of the spread code of the communication counterpart is completed by each of the master unit and the slave unit. In other words, the master unit recognizes the spread code B of the slave unit, whereas the slave unit recognizes the spread code A of the master unit. Under this status, the communication synchronization is established between the master unit and the slave unit. By holding the synchronization (intermittent communication timing) in a predetermined memory, it is possible for the master unit and the slave unit to maintain the intermittent communication timing for transmission/reception. Note that it is also possible to arbitrarily change the intermittent communication timing depending on individual specifications.

The slave unit continuously transmits the spread code B allocated to itself at the intermittent communication timing described above and then receives the spread code A from the master unit, thereby holding the synchronization.

The master unit also continuously waits for the spread code B from the slave unit at the intermittent communication timing detected under the previous state and then transmits the spread code A. In this case, as a carrier frequency used for carrier modulation/demodulation, a carrier frequency obtained by correcting the deviation from the carrier frequency of the slave unit calculated under the previous state is used. Also under the synchronization holding state, when receiving the spread code B from the slave unit, the master unit continues to detect the carrier frequency deviation amount and an intermittent communication timing deviation amount, and sequentially corrects the deviation amounts by itself. Therefore, through all states, it becomes unnecessary for the slave unit to perform complicated processes such as the carrier frequency correction and the timing correction, which makes it possible to simplify a construction of the slave unit.

Under this synchronization holding state, as in the case of the asynchronous state, each of the master unit and the slave unit transmits only a section corresponding to one data (corresponding to one cycle of the spread code) at the time of transmission. At the time of reception, however, unlike in the case of the asynchronous state, each of the master unit and the slave unit receives a section corresponding to "two data+$\alpha$ (corresponding to two cycles of the spread code+$\alpha$)". This is because it is required to determine whether the data is data only for the synchronization holding (only the spread code) or application data sent after the synchronization holding. On the other hand, at the time of reception, a correlation value of the data is detected for each data section.

It is possible to make the determination described above by following a procedure described below. That is, in the case of the data only for the synchronization holding, a correlation peak is obtained in the first data section but no correlation peak is obtained in the second data section. When there is no correlation peak in the second data section, it is judged that the data only for the synchronization holding is received and the reception is ended at that point in time. When the correlation peak is obtained also in the second data section, it is judged that the application data is received and the reception section is elongated by one data length at a time after that (the state transits to the "transmission/reception state"). The sign "+$\alpha$" in the above description corresponds to a process time required for confirming the correlation value of the reception data. By using such a procedure, it becomes unnecessary to elongate the reception section by a data length of the application data in order to wait for the application data, which makes it possible to achieve a reduction of current consumption.

(Transmission/reception State ST3)

The transmission/reception state ST3 is a state under which, on the condition that the current state is the "synchronization holding state", transmission/reception of data is started by the master unit or the slave unit. When there arises a necessity to perform data transmission/reception by the master unit or the slave unit under the "synchronization holding state", the state transits to the transmission/reception state and the data transmission/reception is performed in accordance with the held synchronization (intermittent communication timing). The master unit and the slave unit both confirm the correlation value for each data and elongate the reception section by a length of the next data (+$\alpha$) when a peak (value equal to or greater than a threshold value) is obtained as described above. An upper limit of the transmission section may be determined according to an application or no limit may be set for the section. Also, a handshake process for receiving ACK (reception confirmation signal) from a reception side may be performed periodically.

When transmission by one of the master unit and the slave unit is ended, the transmission/reception state returns to the "synchronization holding state" and the transmission/reception of the spread code for the synchronization holding is resumed from the next intermittent communication timing.

(Example of Construction of High Frequency Radio Apparatus)

Next, an example of a construction of a high frequency radio apparatus that operates as the master unit or the slave unit for enabling the communication described above will be described. It is possible to use the same construction for both of the high frequency radio apparatus that operates as the master unit and the high frequency radio apparatus that operates as the slave unit, but functional blocks that are activated at the time of operation differ between the master unit and the slave unit to some extent. Also, functional blocks of the master unit that are activated before the synchronization establishment and functional blocks of the master unit that are activated after the synchronization holding are different from each other.

The master unit and the slave unit both include a signal processing part having a function of a transmitting part and a function of a receiving part in combination in addition to a radio part including an antenna. For ease of explanation, the following description will be made by referring to the high frequency radio apparatus or the signal processing part as master unit or slave unit.

Figure 3:
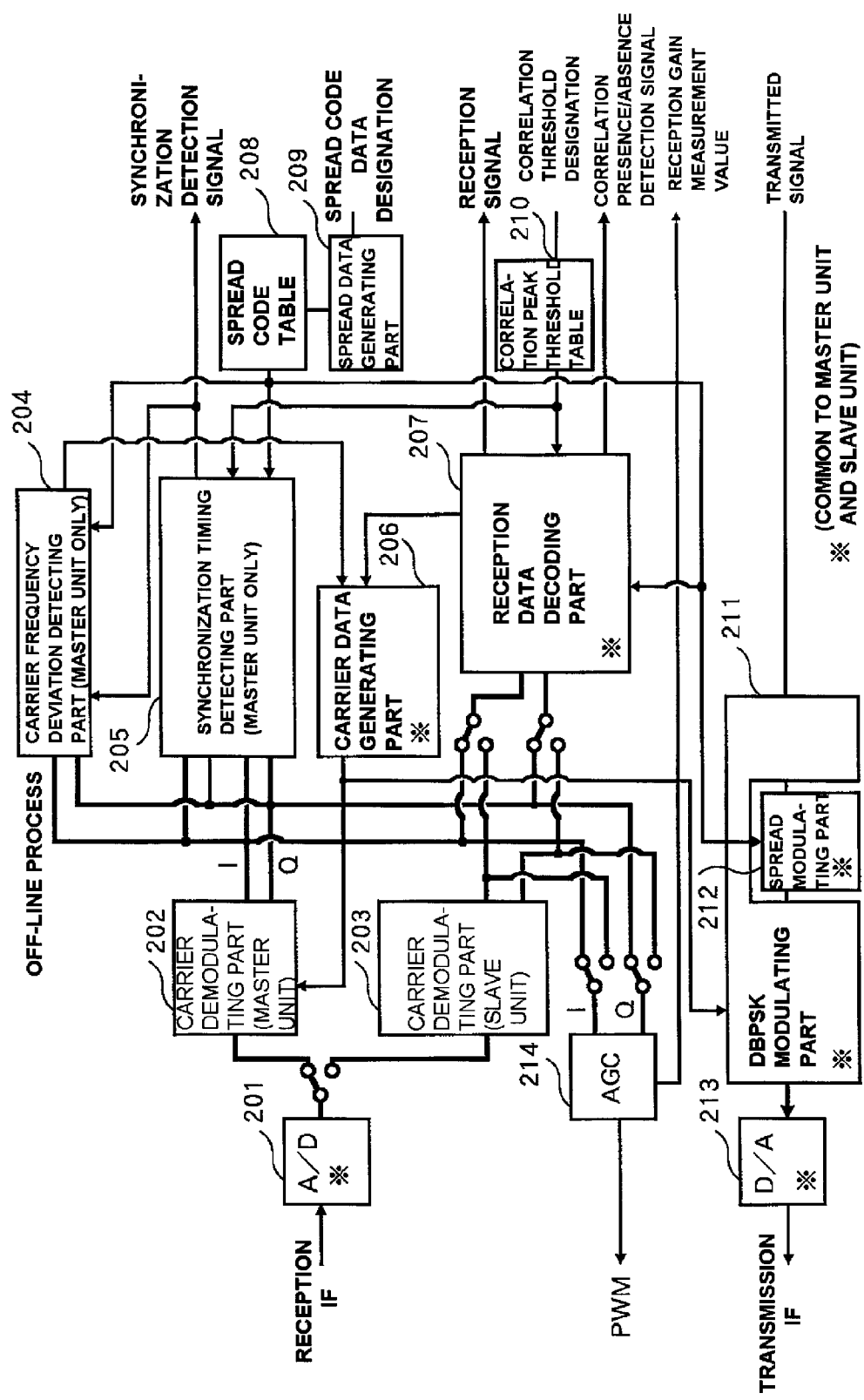
FIG. 3 is an overall construction diagram of a signal processing part of the high frequency radio apparatus that is operable as the master unit and the slave unit.
Figure 4:
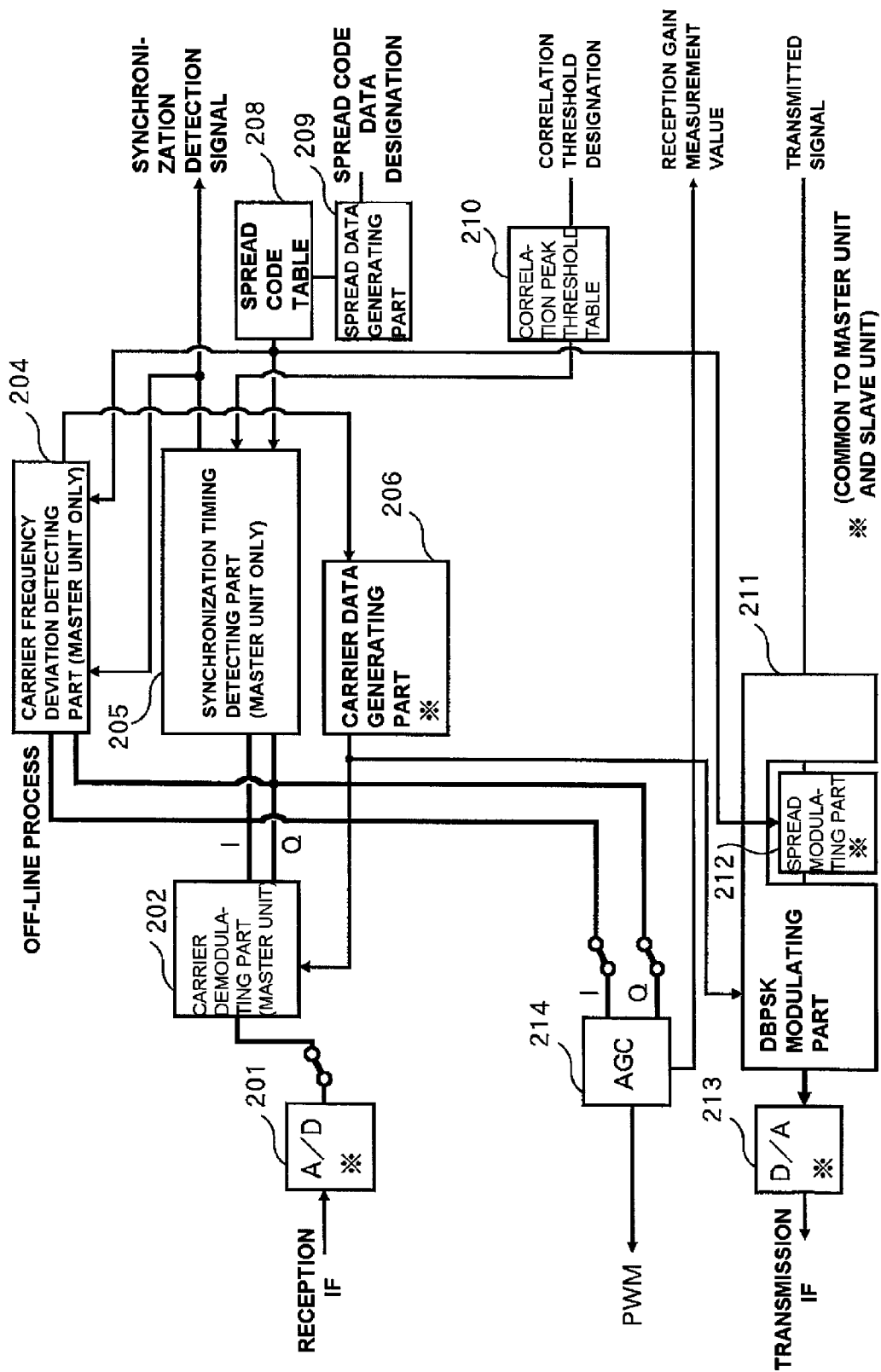
FIG. 4 is a construction diagram of the signal processing part of the master unit in an initial reception stage.
Figure 5:
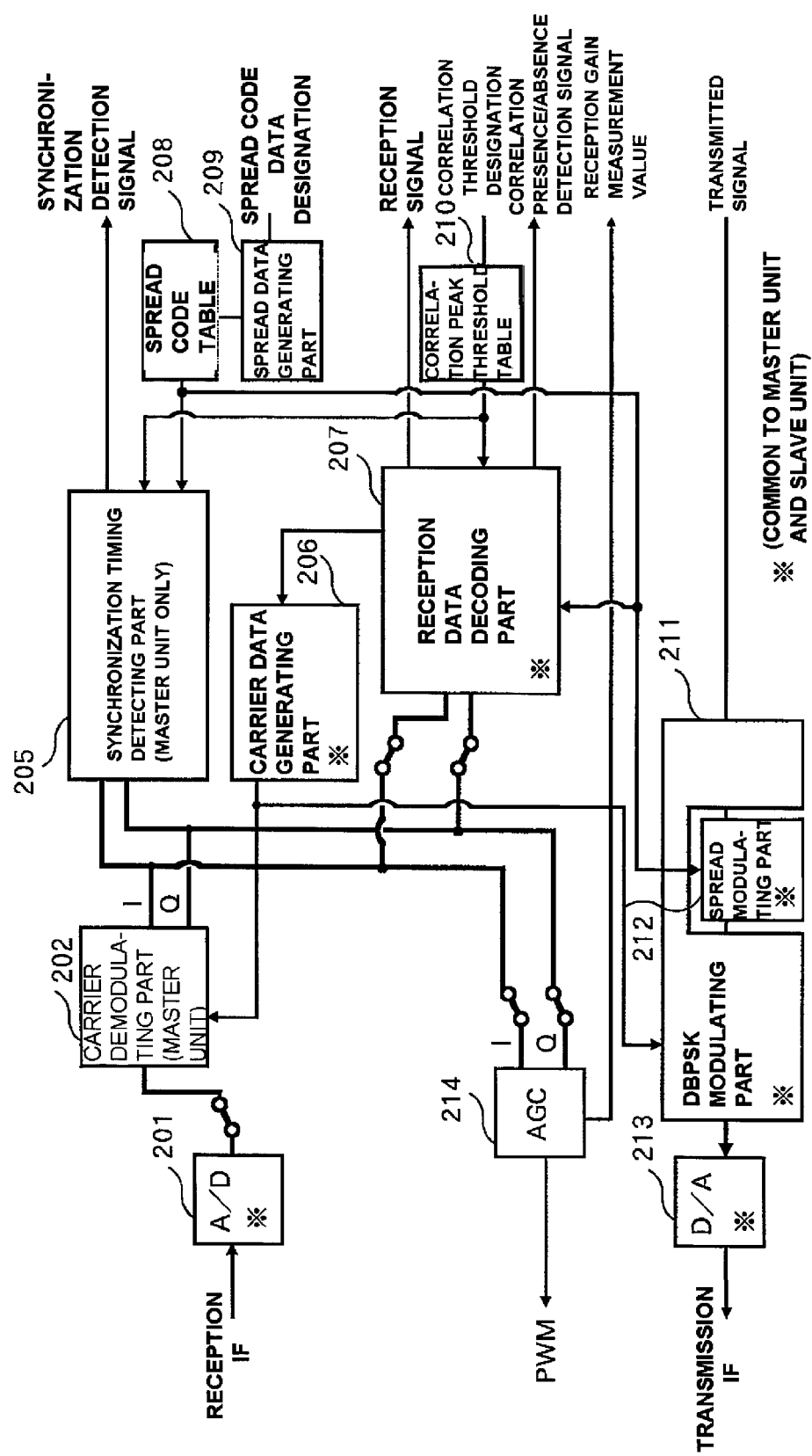
FIG. 5 is a construction diagram of the signal processing part of the master unit under the synchronization holding state.
Figure 6:
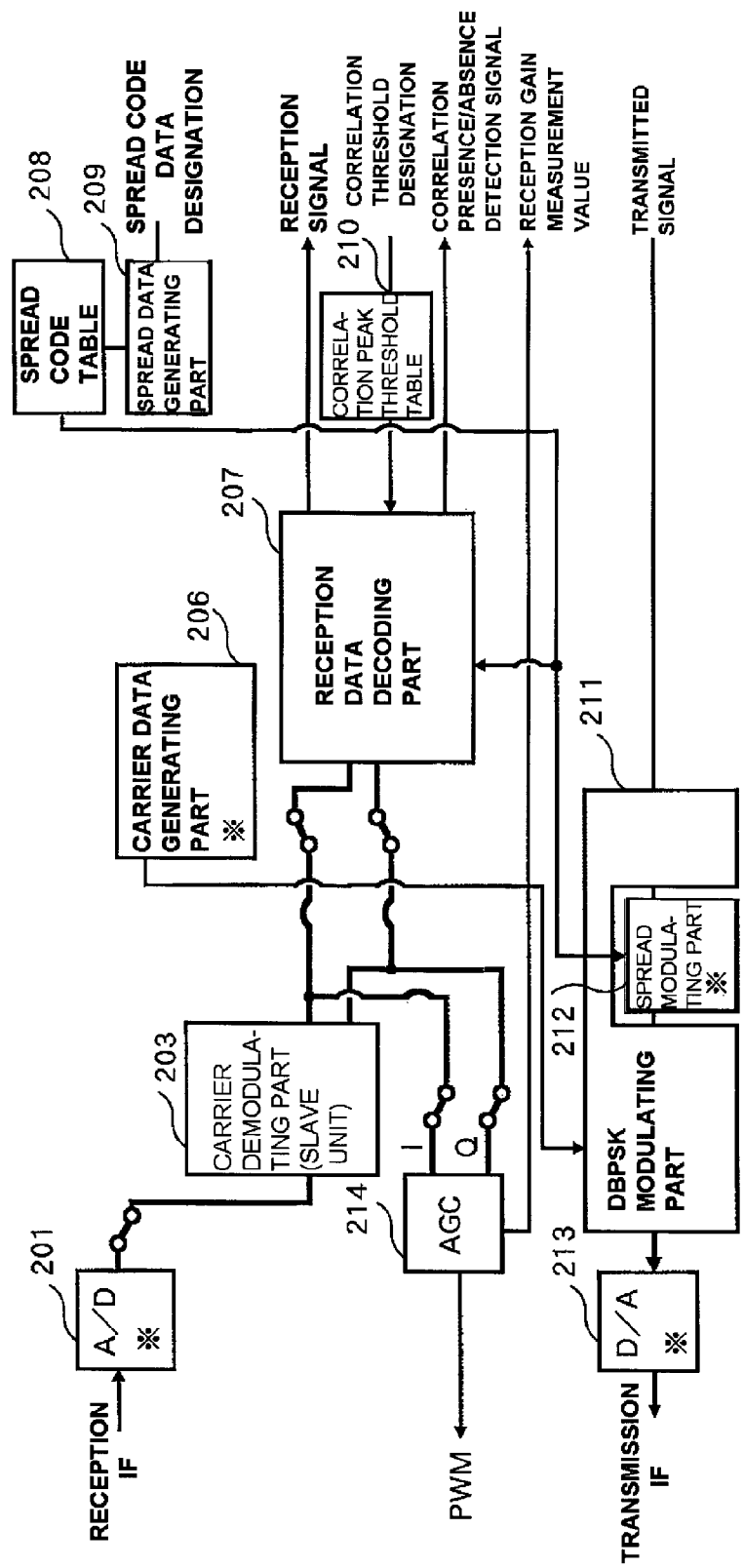
FIG. 6 is a construction diagram of the signal processing part at the time when the high frequency radio apparatus operates as the slave unit.
Figure 7:
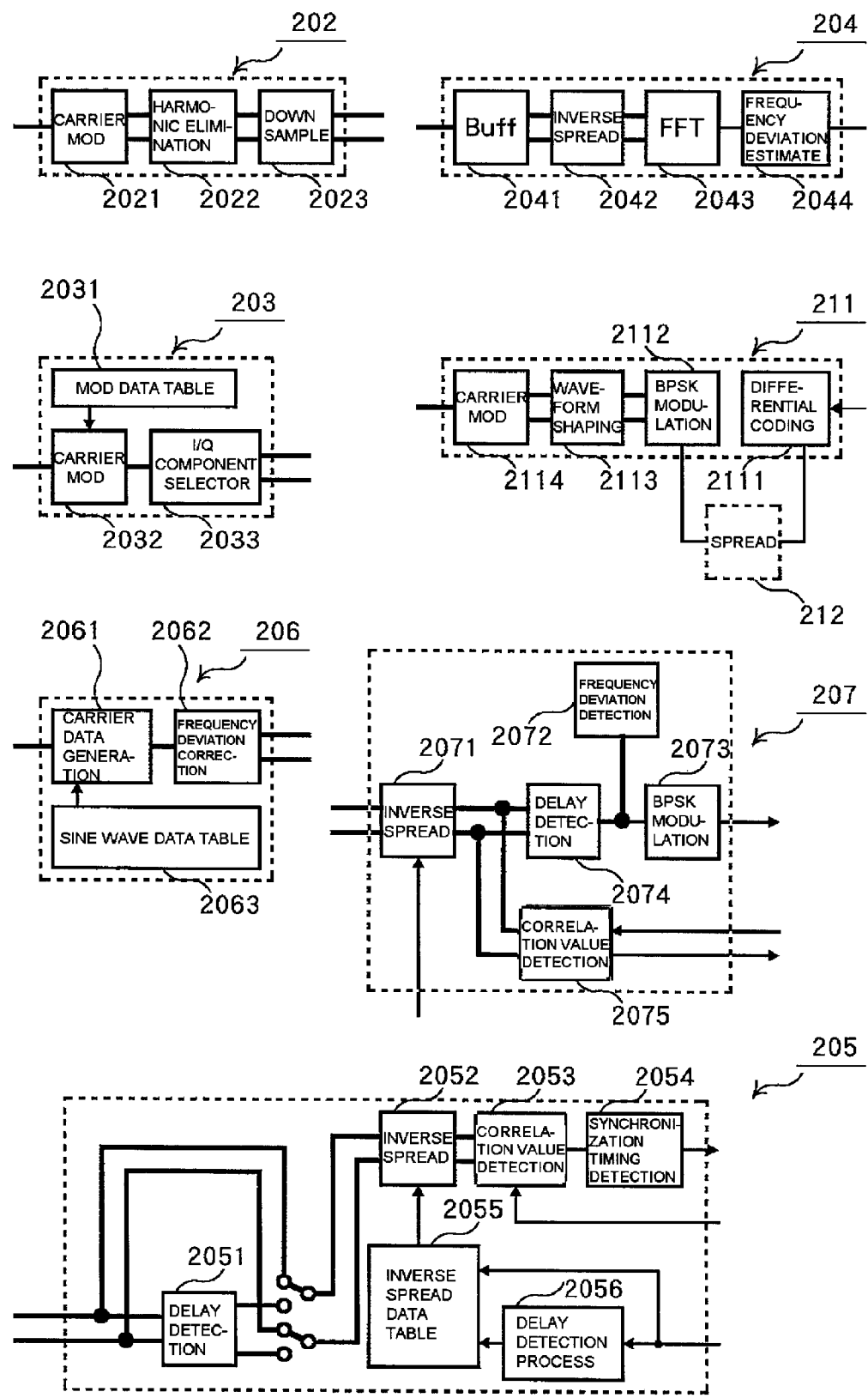
FIG. 7 is a detailed construction diagram of main blocks in the signal processing part.

FIG. 3 is an overall construction diagram of the signal processing part, FIG. 4 is a construction diagram of the signal processing part before the synchronization establishment, which operates as the master unit, and FIG. 5 is a construction diagram of the signal processing part after the synchronization holding, which operates as the master unit. FIG. 6 is a construction diagram of the signal processing part that operates as the slave unit. In addition, FIG. 7 shows detailed construction diagrams of main blocks in FIGS. 3 to 6.

(Transmitting Part)

First, a construction of the transmitting part that is common to the master unit and the slave unit will be described.

The transmitting part mainly includes functional blocks in lower areas of FIGS. 3 to 6 as construction elements. In other words, the transmitting part includes a DBPSK modulating part 211, a spread modulating part 212, and a D/A converting part 213.

The DBPSK modulating part 211 digitally performs BPSK modulation of transmission data and includes functional blocks of a differential coding circuit 2111, a BPSK modulating circuit 2112, a waveform shaping circuit 2113, and a carrier modulating/demodulating circuit (carrier MOD) 2114 as shown on the right-hand side of the second level from the top of FIG. 7, for instance.

The differential coding circuit 2111 performs differential coding of transmission data sent from a control part (not shown) included in the high frequency radio apparatus and sends out an output thereof to the spreading circuit 212. The spreading circuit 212 performs spread modulation on the differentially coded transmission data. Note that a construction is also possible in which the differential coding circuit 2111 and the spreading circuit 212 are provided on a single circuit board.

The BPSK modulating circuit 2112 performs level conversion of the spread modulation signal outputted from the spreading circuit 212. In other words, the inputted spread modulation signal has levels of only "0" and "1", so the BPSK modulating circuit 2112 level-converts those levels into "1" and "−1", respectively. When primary modulation/demodulation in the communication system is BPSK modulation/demodulation, a carrier phase of data "1" and "0" ("−1" and "1") is 180 degrees, so transmission spurious tends to occur. The waveform shaping circuit 2113 removes this transmission spurious with respect to the transmission data level-converted into "1" and "−1" in the former stage, thereby performing waveform shaping. The carrier MOD 2114 performs modulation by multiplying the waveform-shaped transmission data by a carrier. The carrier data multiplied here is data from a carrier data generating part 206 to be described later. When the high frequency radio apparatus operates as the master unit, the data is data subjected to a carrier frequency deviation correction. On the other hand, when the high frequency radio apparatus operates as the slave unit, the data is default carrier data. Details will be described later.

The DBPSK modulating part 212 has a special construction that is different from a construction of a conventional BPSK modulating part of this type. A general document concerning spread spectrum communication describes that a conventionally known BPSK modulating part or BPSK modulating circuit performs the transmission data process in the stated order of (1) the differential coding, (2) the level conversion, (3) the BPSK (DBPSK) modulation (carrier MOD), and (4) the spread modulation, meaning that at a point in time of the spread modulation, the transmission data is already level-converted. With such a construction, however, it is impossible to suppress a gate scale in the case where circuit components are implemented on an IC chip. In order to improve this point and suppress the gate scale as much as possible, the DBPSK modulating part 212 in this embodiment performs a process not using a multiplier but through exclusive ORing at the time of the spread modulation, and makes a block arrangement in the stated order so that conversion into a multi-bit form is performed at a latter stage as possible.

The D/A converting part 213 D/A-converts the data outputted from the DBPSK modulating part 211 and sends a result of the conversion to the radio part (not shown) of a latter stage.

In both of the master unit and the slave unit, the transmitting part is constructed in the manner described above, but an operation thereof differs between the case of the master unit and the case of the slave unit to some extent.

In other words, in the case of the master unit, at a point in time when a synchronization signal from the slave unit is detected at the receiving part to be described later, the transmitting part sends out a synchronization establishment notification signal indicating that synchronization is established to the slave unit at the next intermittent communication timing. As the synchronization establishment notification signal, only the spread code A is sent out. In other words, the transmitted signal assumes "1". As a carrier to be used, a carrier obtained by correcting the deviation amount of the carrier frequency of the slave unit detected at the receiving part to be described later is used. With this construction, when received data is carrier-demodulated on a slave unit side, by performing the demodulation using carrier data of the slave unit itself, it becomes possible to obtain demodulation data including no deviation component. A transmission timing from the master unit is set to a timing determined in advance between the slave unit and the master unit.

The slave unit waits for the spread code A from the master unit after a fixed time since sending out the synchronization signal, and the master unit sends out the spread code A in accordance with a timing of reception by the slave unit.

(Construction of Master Unit Before Synchronization Establishment)

Next, a construction in the signal processing part having the construction shown in FIG. 3 when the high frequency radio apparatus operates as the master unit before the synchronization establishment, in particular, a construction of the receiving part will be described with reference to FIGS. 4 and 7.

The receiving part mainly corresponds to functional blocks substantially in an upper area of FIG. 3. In other words, reception IF from the radio part (not shown) is inputted to an A/D converting part (A/D) 201. The reception IF is an analog intermediate frequency signal obtained by converting a frequency of a received signal into a frequency of 48 (kHz), for instance. The A/D converting part 201 digitally converts the reception IF into five-bit reception data or the like and then selectively sends the data to a carrier demodulating part 202.

It should be noted here that the A/D converting part 201 is common to the master unit and the slave unit, but an operation frequency thereof differs between the master unit and the slave unit.

Switching of the output from the A/D converting part 201 to the carrier demodulating part 202 is performed by the control part (not shown). The carrier demodulating part 202 is a part for removing a carrier component from the reception data and demodulating a data component. Here, in the initial reception stage before the synchronization establishment, a deviation amount between carrier frequency components of the master unit and the slave unit is not grasped. Therefore, the carrier demodulating part 202 performs the demodulation based on default carrier data determined in advance.

The reception data carrier-demodulated using the default carrier data is led to a synchronization timing detecting part 205, at which synchronization detection is performed.

After the synchronization detection, a carrier frequency deviation amount is detected at a carrier frequency deviation detecting part 204 and a result of the detection is outputted to a carrier data generating part 206. The carrier data generating part 206 generates carrier data after the correction described above and sends this data to the carrier demodulating part 202 instead of the default carrier data.

It should be noted here that constructions and operations of the carrier frequency deviation detecting part 204, the synchronization timing detecting part 205, and the carrier data generating part 206 will be described in detail later.

The carrier demodulating part 202 receives the carrier data after the correction and performs carrier demodulation by multiplying subsequent reception data from the slave unit by this corrected carrier data at a carrier MOD part 2021. The carrier data to be multiplied includes two kinds of data whose phases are different from each other by 90 degrees, in other words, complex data of an in-phase component (I component) and a quadrature component (Q component). The reception data carrier-demodulated in this manner is subjected to cutting of a harmonic component by a harmonic removing filter 2022, and is then inputted to a downsample part 2023. The downsample part 2023 performs a downsampling process in accordance with a process frequency of a latter block. Note that this process may be eliminated depending on an application or a system used.

As described above, in the initial reception stage, even when there is a deviation between the carrier frequency of the master unit and the carrier frequency of the slave unit, it is impossible to correct the deviation at the master unit, so even when the spread code of the slave unit is received, a frequency component corresponding to the carrier frequency deviation remains in the data after the carrier demodulation. Therefore, at the master unit, in the initial reception stage, the output of the A/D converting part 201 is led to the carrier demodulating part 202 and is further led to the synchronization timing detecting part 205, and a frequency deviation detecting process is performed at the carrier frequency deviation detecting part 204 based on a synchronization detection signal detected at the synchronization timing detecting part 205.

In actuality, the deviation detection process at the carrier frequency deviation detecting part 204 is performed at the synchronization timing detecting part 205 through an off-line process before the next reception time after the spread code from the slave unit is detected. As shown in an upper right-hand area of FIG. 7, the carrier frequency deviation detecting part 204 is provided with a buffer (Buff) 2041 at its initial stage. The buffer 2041 is constructed from multiple shift registers and constantly continues to shift carrier demodulated data while waiting for the spread code of the slave unit at the synchronization timing detecting part 205.

The buffer 2041 has a shift register length of "(spread code length×oversample number) +α". Then, a data shift process to the shift registers of the buffer 2041 is stopped with a synchronization detection signal outputted from the synchronization timing detecting part 205 at the time of detection of the spread code of the slave unit as a trigger, thereby holding the carrier demodulated data at that point in time. Accordingly, "α" of the shift register length described above corresponds to a time necessary for detecting the peak of the correlation value and for outputting the synchronization detection signal, and data corresponding to "(spread code length×oversample number)" from the final stage after holding becomes the reception data. The reception data at this point in time is not yet subjected to the carrier frequency deviation correction, so the carrier frequency deviation (difference) of the communication counterpart (slave unit) remains in the transmitted spread process data.

An inverse spreading circuit 2042 performs an inverse spread process on held reception data, thereby extracting a sine wave component expressing the deviation from the carrier frequency of the slave unit. Note that the spread code used in the inverse spread process is a normal spread code. An FFT circuit 2043 performs a fast Fourier computation (FFT) process, thereby calculating a frequency component of the sine wave described above. Input data of the FFT circuit 2043 is also complex data, so the FFT circuit 2043 performs the FFT on each of the I component and the Q component. A phase of data of the I component and a phase of data of the Q component are shifted by 90 degrees, so positive/negative of the frequency deviation in the FFT changes in a direction of the phase shift. A frequency deviation estimating part 2044 analyzes the frequency component obtained through the FFT, and outputs a deviation amount from the default carrier frequency as numeric data.

It should be noted here that a detection frequency interval Δf by the FFT becomes a numeric value expressed by the following expression when the computation point N is set to 1,024 and a computation process frequency (1/Δt) is set to 64 (kHz), for instance.

$$\Delta f = 1/(\Delta t \times N) = 62.5 \text{ (Hz)}$$

The number of multipliers and the number of adders required for performing 1,024 computations are "5,120" and "10,240", respectively, in a theoretical value even when an FFT algorithm is applied. Therefore, in order to achieve a reduction of the number of gates, it is preferable that the following measures be taken.

(1) The FFT is performed only on data within a range of a frequency deviation amount assumed from specs (ordinary temperature deviation or temperature deviation) of a device used, an operating environment, or the like.

(2) There is an interval of several seconds until the next data reception from an effective data length, so the number of gates is reduced by repeatedly using the multipliers/adders. The number of gates reduced is determined in accordance with the reception interval.

Figure 9:
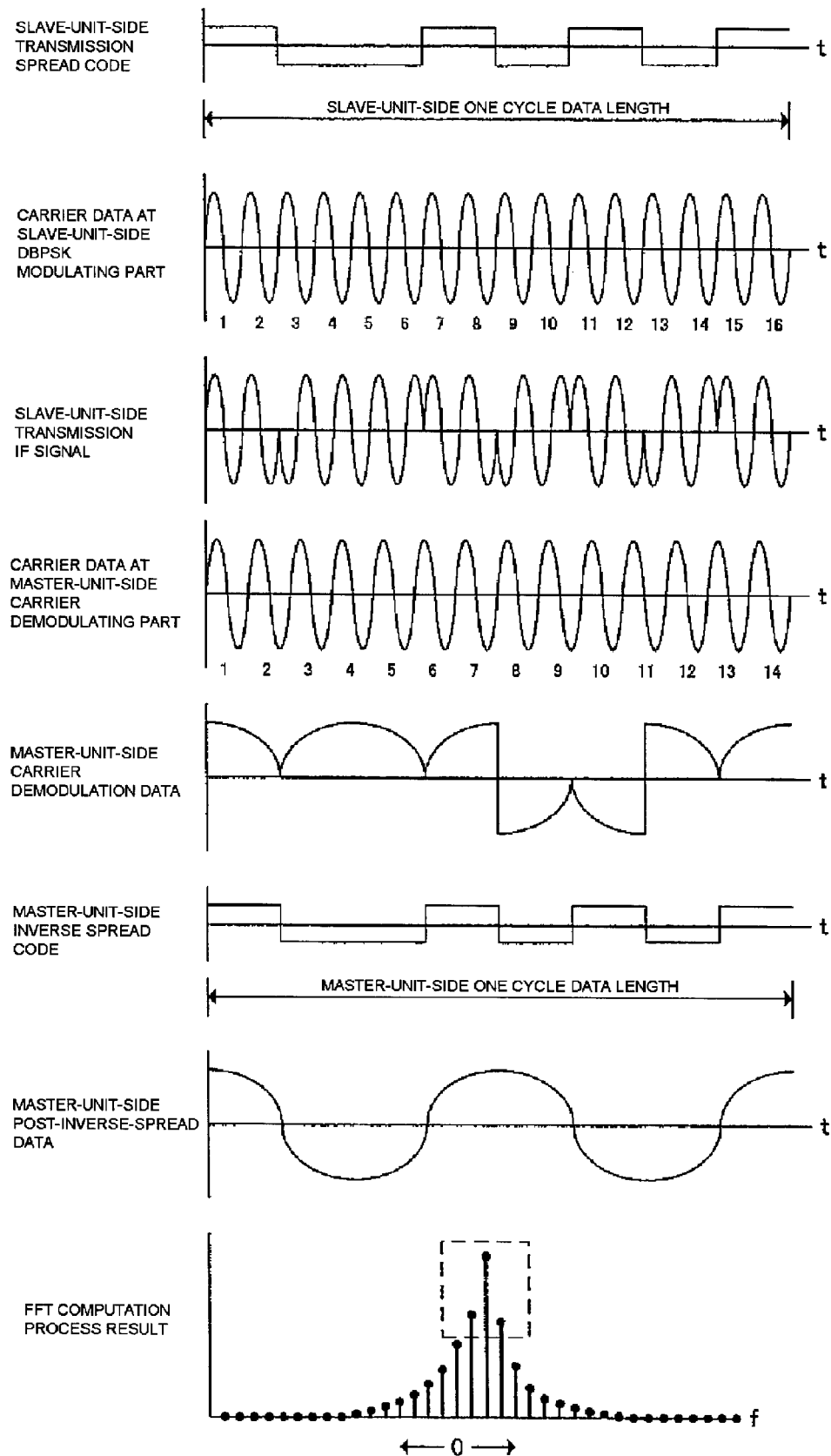
FIG. 9 are explanatory diagrams specifically illustrating an operation of a carrier frequency deviation detecting part.

FIG. 9 specifically shows the operation of the carrier frequency deviation detecting part 204 described above. In a graph on each level (except for the lowermost level), a vertical axis indicates a data level and a horizontal axis indicates a time (t). In the figure, an example is illustrated in which a carrier frequency ratio between the slave unit and the master unit is "8 (slave unit): 9 (master unit)". In a slave-unit-side transmission spread code on the uppermost level, a positive level is "1" and a negative level is "−1". When carrier data on a slave unit side is carrier data shown on the second level from the top of FIG. 9, a phase of the transmission IF signal on the slave unit side after the D/A conversion is inverted at the time of a change of a data level, as shown on the third level from the top of FIG. 9.

A frequency of the default carrier data at the carrier demodulating part 202 differs from the frequency of the carrier data of the slave unit to some extent as shown on the fourth level from the top of FIG. 9 (in the illustrated example, the frequency of the carrier data of the slave unit is slightly higher than the frequency of the default carrier data at the carrier demodulating part). In the carrier demodulated data, the carrier frequency deviation component between the slave unit and the master unit remains as shown on the fifth level from the top of FIG. 9. Note that as to the data level indicated by the vertical axis on the sixth level from the top of FIG. 9, a positive data level is set to "1" and a negative data level is set to "−1".

Data after the inverse spread in the master unit becomes frequency data corresponding to a difference between the reception IF and the carrier data, as shown on the seventh level from the top of FIG. 9. By performing the FFT (fast Fourier transform) on this frequency data, a discrete data row having a waveform shown on the lowermost level of FIG. 9 is obtained. A horizontal axis on the lowermost level of FIG. 9 indicates a frequency (f). A deviation amount of a peak value of this discrete data row from the default carrier frequency is derived through a computation process, and this deviation amount is outputted to the carrier data generating part 206 as numeric data.

As shown on the left-hand side of the third level from the top of FIG. 7, the carrier data generating part 206 includes a carrier data generating circuit 2061, a frequency deviation correcting circuit 2062, and a sine wave data table (carrier data table) 2063. In the sine wave data table 2063, sine wave data that is basic data for generating the carrier data is stored. A value of the sine wave data may be stored in the sine wave data table 2063 in advance, or may be generated at the time of an initial operation or the like and accumulated in the sine wave data table 2063.

Figure 10:
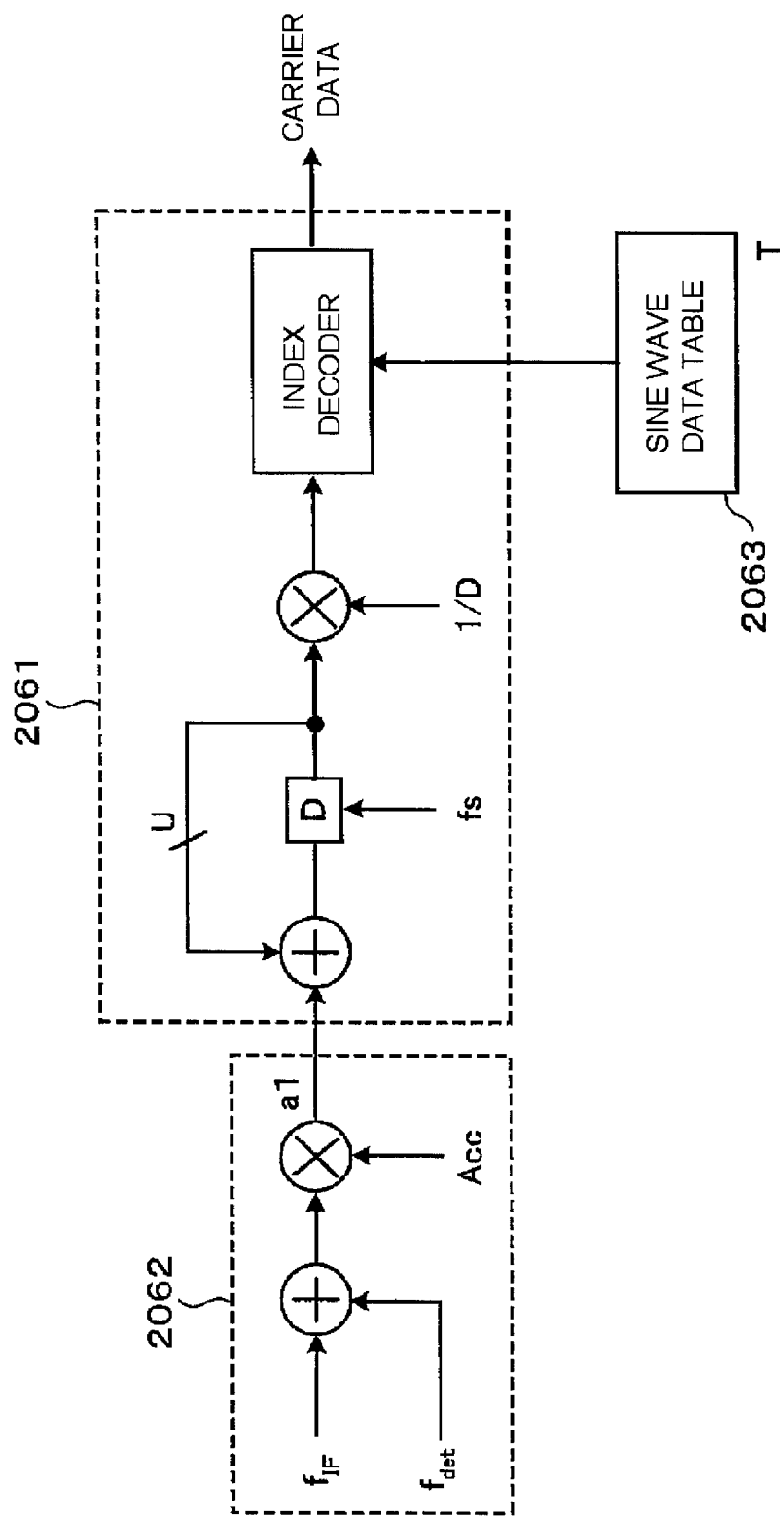
FIG. 10 is a construction diagram of a carrier data generating circuit and a carrier frequency correcting circuit.

The carrier data generating circuit 2061 and the carrier frequency correcting circuit 2062 are constructed as shown in FIG. 10, for instance. In FIG. 10, when the number of tables of the carrier data in the sine wave data table 2063 is represented by "T", a frequency deviation correcting sensitivity is represented by "Acc", a deviation correcting frequency is represented by "fdet", the default carrier frequency is represented by "flF", and an operation process frequency is represented by "fs", first, the carrier frequency correcting circuit 2062 derives a carrier generation count coefficient a1, a division coefficient D after coefficient integration, and a bit upper limit value u of an integration circuit in accordance with relational expressions given below.

$$a1=(flF+fdet)/Acc$$

$$D=fs/(T*Acc)$$

$$u=\log 2(fs)-\log 2(Acc)$$

In the above relational expressions, when T is set to "128", Acc is set to "2 (Hz)" (minimum correction frequency unit is set to "2 (Hz)"), fdet is set to "1 (kHz)", flF is set to "49.152 (kHz)", and fs is set to "262.144 (kHz)", the carrier generation count coefficient a1, the division coefficient D, and the bit upper limit value u become as follows.

$$a1=25,074$$

$$D=1,024$$

$$u=17$$

The carrier data generating circuit 2061 performs an integration process (count process) on the coefficient a1 obtained by the carrier frequency correcting circuit 2062 in a process frequency (fs) step with the bit upper limit value u. An overload in this integration process is neglected. After that, division by the division coefficient D, for which an integration circuit output is obtained, is performed.

By performing a bit shift process obtained from D, it becomes possible to perform computation in this division process with ease (in this example, D is "1" and 24 is "1010", so a 10-bit shift process is performed).

A value after the bit shift process becomes an index value of the sine wave data, in accordance with this index value, so it is extracted from the sine wave data table 2063 as the carrier data in accordance with this index value.

The count coefficient a1 obtained by the carrier frequency correcting circuit 2062 is a coefficient for calculating the index value for extracting the sine wave data converted into a table form, and an index value extracted through an increase/decrease of a deviation correction amount also changes. For instance, in the example described above, when fdet is "0", a1 becomes "24,576".

When a count process is performed using this coefficient, advancement of the extracted index value becomes slower than that in the case where fdet is "1 (kHz)". Accordingly, a frequency of the extracted carrier data also becomes low. A range of the carrier data becomes a range corresponding to the D/A (digital/analog) and A/D (analog/digital) bit numbers, but in the case of carrier data used at the time of transmission, use in a full range is impossible from a practical viewpoint, so preparation is made within a realizable range.

The carrier data generated by the carrier data generating circuit 2061 is sent to the DBPSK modulating part 212 and the carrier demodulating part 202 described above.

It should be noted here that the carrier data after the correction also includes two kinds of data whose phases are different from each other by 90 degrees, in other words, complex data of an in-phase component (I component) and a quadrature component (Q component). Accordingly, in an actual circuit construction, it is required to generate two pieces of carrier data corresponding to the in-phase component and the quadrature component by separately providing carrier data tables of sine waves whose phases are different from each other by 90 degrees, or newly generating an index value whose phase is different from that of a certain index value by 90 degrees with an index decoder circuit. Also, in an actual circuit, a carrier frequency deviation is detected by each of the carrier frequency deviation detecting part 204 and a reception data decoding part 207 to be described later, whereby a correction process is performed with a result of addition of each detection value set as the fdet described above.

After detecting the frequency deviation amount, the carrier demodulating part 202 performs carrier demodulation by multiplying the carrier data after the frequency deviation correction sent from the carrier generating part 206 described above by the reception data at the carrier MOD part 2021.

Next, the synchronization timing detecting part 205 will be described in detail.

Figure 8:
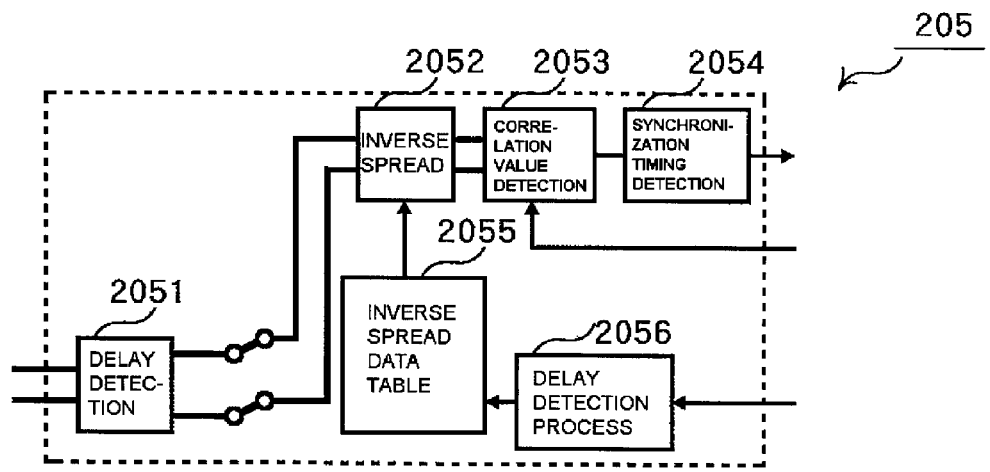
FIG. 8A is a construction diagram of a synchronization timing detecting part before synchronization is established and FIG. 8B is a construction diagram after the synchronization is held.
Figure 8:
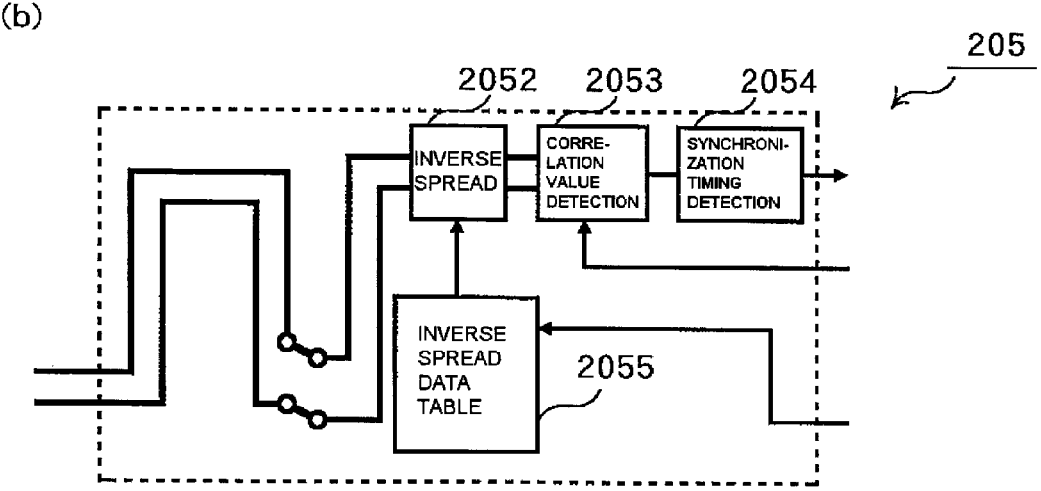

The synchronization timing detecting part 205 is a functional block only for the master unit. An example of a detailed construction thereof is shown on the lowermost level of FIG. 7. At the synchronization timing detecting part 205, the contents of its operation are changed between an initial reception stage, in which synchronization is not established, and a state where the synchronization is established. In other words, in the initial reception stage, as shown in FIG. 8A, the reception data after the carrier demodulation outputted from the carrier demodulating part 202 is inputted to an inverse spreading circuit 2052 through a delay detection circuit 2051, but under a status in which the synchronization is held, as shown in FIG. 8B, the reception data after the carrier demodulation is inputted to the inverse spreading circuit 2052 while skipping the delay detection circuit 2051. This input switching is performed by the control part (not shown) that receives the synchronization detection signal.

First, an operation in the case of FIG. 8A will be described. Under a standby status, the master unit detects the spread code from the slave unit under the continuous reception status. Note that even when the spread code from the slave unit is received, as described above, when there is a carrier frequency deviation, a frequency component corresponding to a difference remains in the reception data after the carrier demodulation, so it is impossible to perform an inverse spread process as it is. Therefore, before the inverse spread is performed by the inverse spreading circuit 2052, delay detection is performed by the delay detection circuit 2051, thereby avoiding an influence of the deviation frequency component. In consideration of the inverse spread process performed afterward, a delay amount at the time of the delay detection is set to a spread code rate (one chip).

More specifically, data inputted to the synchronization timing detecting part 205 is converted into complex data at the carrier demodulating part 202. Therefore, it is required to perform delay detection on those pieces of complex data at the delay detection circuit 2051 before the inverse spread. When input data at the present moment is referred to as "I and Q" and input data preceding this input data by one chip is referred to as "Id and Qd", the delay detection circuit 2051 performs the delay detection through a computation process expressed by an expression given below.

$$(I+jQ)*(Id-jQd)=(I*Id+Q*Qd)+j(Q*Id-I*Qd)$$

I component data (I*Id+Q*Qd) and Q component data (Q*Id−I*Qd) calculated according to the above expression are each inverse-spread by the inverse spreading circuit 2052. Note that the spread code used here is subjected to the delay detection at a previous stage, so it is impossible to use the spread code used at the slave unit. Therefore, as in the case of reception, a code obtained by performing a process corresponding to the delay detection on the spread code is used for the inverse spread.

The delay detection process on the spread code is a process involving, in accordance with a spread code data designation from the control part (not shown), recording in an inverse spread data table 2055 a delay detection code generated by a delay detection process circuit 2056 with respect to a code inputted from the spread data generating part 209 and the spread code table 208 (see FIGS. 3 and 4), and inputting the code to the inverse spreading circuit 2052 as an inverse spread code, for instance. The delay detection is performed on the reception data, so the code corresponding to the first chip assumes an undefined value. Therefore, at the time of the inverse spread, the spread code corresponding to the first chip is not included. Accordingly, when the spread code length is 128 chips, for instance, the spread code corresponding to 127 chips from the second to 128th chips after a differential process is used for the inverse spread.

As for a concrete process method of the delay detection process circuit 2056, a delay detection code is obtained by exclusive-ORing the inputted spread code ("1" or "0") and a code obtained by shifting the inputted code by one chip. Note that in this stage, the code is still "1" or "0", so it is required to perform the level conversion into "1" or "−1" for the inverse spread process before the recording in the inverse spread data table 2055.

The data inversely spread by the inverse spreading circuit 2052 is inputted to a correlation value detecting circuit 2053. In order to detect the correlation value of the data in each chip, the correlation value detecting circuit 2053 adds a part of each data after the inverse spread, which corresponds to one cycle of the spread code, and obtains a vector sum $(=\sqrt{(I2+Q2)})$ of an addition value of the I component data and an addition value of the Q component data. A property that the vector sum increases in the case of data having a correlation is utilized.

It should be noted here that as a method of confirming the correlation value of the data at the time when the synchronization is not established, it is also possible to adopt a matched filter method. Accordingly, it becomes possible to instantaneously detect the correlation peak value for the reception data from the communication counterpart inputted at a random timing.

Figure 12:
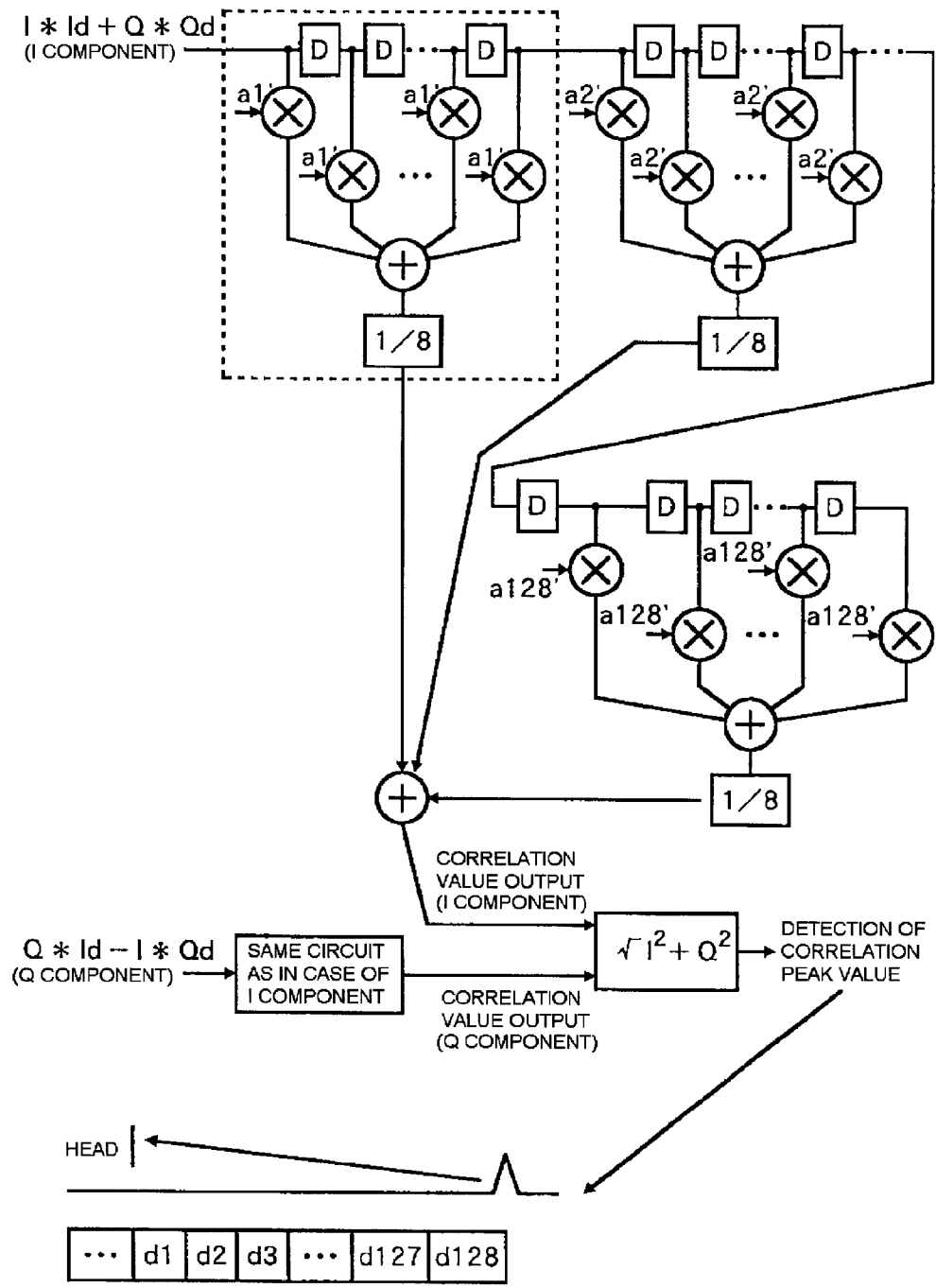
FIG. 12 is an explanatory diagram of an operation of a carrier demodulating part that is activated when the high frequency radio apparatus operates as the slave unit.

FIG. 12 shows an overview of a correlation value detection process at the correlation value detecting circuit 2053, with a case where the spread code length is 128 chips and an eight-times oversample process is performed for one chip as an example. In the figure, an example of correlation value output for the I component is shown. A broken line in the figure indicates a construction in the case where obtainment of a correlation value is performed by performing sampling eight times for one chip. Reference numerals "a1'" to "a128'" denote codes used for the inverse spread that are obtained by performing a delay detection process and level conversion on spread codes a1 to a128 that are fixedly allocated.

A correlation value output value of the Q component is also obtained in the same manner. A correlation peak value is detected by obtaining a vector sum for those correlation value output values and the head of a reception data row ( . . . d1 to d128) is calculated from a position of the correlation peak value (see a lower area of FIG. 11).

A synchronization timing detecting circuit 2054 judges, when a peak value that is equal to or greater than a threshold value determined in advance is detected from a result of the detection by the correlation value detecting circuit 2053, that the spread code from the communication counterpart has been confirmed, and outputs the synchronization detection signal. The synchronization detection signal is a signal used to identify the data range at the carrier frequency deviation detecting part 204 and identify a subsequent intermittent transmission/reception timing. The head of the spread code from the communication counterpart precedes a point (position) of the peak value of the correlation value by one cycle of the spread code and detection accuracy becomes ±1 chip.

By performing an oversample process of processing a process frequency of this confirmation block by a frequency faster than a chip rate, it becomes possible to improve a reception sensitivity with respect to noise and improve the head detection accuracy described above to a ±1 oversample interval.

When the synchronization with the slave unit is established, a transmission/reception operation is repeated at the intermittent communication timing determined in advance. Note that the intermittent communication timing is generated by a clock of the signal processing part, so when a quartz oscillator of 32.768 (kHz) is used for fundamental vibration, for instance, accuracy of a general component becomes around ±10 to 20 (ppm). Therefore, there occurs a considerable temporal deviation of several seconds to several ten seconds. Thus, at the synchronization timing detecting part 2054, the correlation value of the reception signal from the slave unit is detected even after the synchronization holding, and when the temporal deviation becomes large, a process for sequentially updating the synchronization detection signal is performed.

Next, an operation of the synchronization timing detecting part 205 when changed to a state shown in FIG. 8B will be described.

Under the status in which the synchronization is held, the carrier frequency deviation is already corrected, so it is not required to perform the delay detection on the carrier demodulated data. Consequently, in the case of the synchronization holding, as shown in FIG. 8B, the delay detecting circuit 2051 is skipped. As a result, a normal spread code that is not subjected to the delay detection process is used as the spread code at the inverse spreading circuit 2052.

Referring again to FIGS. 3 and 4, an AGC part (AGC) 214 performs control for maintaining a gain (amplitude) of the reception IF inputted to the signal processing part at a fixed value. An amplitude value of the reception IF is estimated in advance from the complex data from the carrier demodulating part 202, and a threshold value for maintaining the amplitude at the fixed value is provided. Note that as to this threshold value, a carrier demodulation method differs between the master unit and the slave unit. Absolute values of the I component and the Q component of the complex data inputted to the AGC part 214 are obtained and are added to each other. Following this, arbitrary response characteristics are given by performing a product-sum operation, and PWM modulation is then performed.

(Construction of Master Unit After Synchronization Holding)

After the synchronization holding, the construction of the master unit becomes as shown in FIG. 5. In this case, a detailed construction of the synchronization timing detecting part 205 changes as shown in FIG. 8B.

After the synchronization holding, a reception data decoding part 207 is activated.

A detailed construction of the reception data decoding part 207 is shown on the right side of the third level from the top of FIG. 7. In this construction, only a frequency deviation detecting part 2071 is a function unique to the master unit and other functions are processes common to the master unit and the slave unit.

In the case of the master unit, the reception data decoding part 207 is activated only at the time of the synchronization holding state ST2 and the transmission/reception state ST3 described above. At the time of the states described above, the carrier frequency deviation amount and the intermittent communication timing are already grasped on a master unit side, so the data from the slave unit is received after the carrier frequency is corrected.

More specifically, an inverse spread process is performed on the reception data (complex data) obtained by separating the carrier at the carrier demodulating part 202, at an inverse spreading circuit 2071. The normal spread code is used as the spread code used at this time. Then, the delay detection process is performed on the reception data (complex data) after the inverse spread process at a delay detection circuit 2074. A delay amount at this time is set to correspond to a data rate of transmission/reception data determined in advance. The data after the delay detection has a value only for the in-phase component (I component) because the carrier frequency deviation is corrected. Accordingly, it becomes possible to obtain decoded data from the reception data by confirming only the in-phase component of the data after the delay detection at a BPSK demodulating circuit 2073.

A correlation value detecting circuit 2075 obtains a correlation value between the data after the inverse spread process and the data from the correlation value peak threshold table 210, and outputs a result thereof.

It should be noted here that depending on a surrounding environment, there is also a possibility that a carrier frequency deviation will occur again. Therefore, when the high frequency radio apparatus operates as the master unit, the reception data after the delay detection is monitored continuously or regularly, an angle thereof is derived from values indicated by the I component and the Q component, and a frequency deviation is detected at the frequency deviation detecting circuit 2072. The frequency deviation component becomes ±¼ of the data rate.

As already described above, the differential coding process is performed at the time of transmission, so original data is decoded by performing the delay detection process on the reception data at the reception data decoding part 207. As described in the overview of the operation under the synchronization holding state ST1, under the synchronization holding state ST2 and the transmission/reception state ST3, data of at least two bits is received on a reception side and confirmation of the correlation value after the inverse spread is performed for each bit. The reception section is elongated while the correlation value for each bit is higher than a threshold value determined in advance.

The inverse spread and the correlation value confirmation at the reception data decoding part 207 adopt a sliding correlation method. By adopting this method, it becomes possible to reduce a gate scale and current consumption.

It should be noted here that the correlation value confirmation process in the case where the high frequency radio apparatus operates as the master unit is performed not only at the reception data decoding part 207 but also at the synchronization timing detecting part 205. However, threshold values used in judgment are different between the synchronization timing detecting part 205 and the reception data decoding part 207. This is because at the synchronization timing detecting part 205, the delay detection process is performed before the inverse spread process, so the reception data at the time of the correlation value confirmation in the case of the synchronization timing detecting part 205 differs from that in the case of the reception data decoding part 207. Consequently, it is required to prepare threshold values that respectively correspond to the synchronization timing detecting part 205 and the reception data decoding part 207 in advance.

(Example of Construction in Case Where High Frequency Radio Apparatus Operates as Slave Unit)

Next, an example of a construction of the signal processing part in the case where the high frequency radio apparatus operates as the slave unit, in particular, an operation of the receiving part will be described with reference to FIGS. 6 and 7.

As described above, when there is a deviation between the carrier frequency of the slave unit and the carrier frequency of the master unit, the deviation is corrected on the master unit side and transmission is performed using the carrier data after the correction, and switching between the synchronization establishment and holding, in other words, the intermittent communication timing adjustment is also performed on the master unit side, which allows the slave unit to perform spread spectrum communication by merely performing a simple reception process regardless of whether synchronization is not yet established or is already held.

The slave unit performs the reception process after a fixed time since performing transmission at an intermittent communication timing set for itself. In FIG. 6, the carrier data (A/D output signal) after the A/D conversion by the A/D converter 201 is inputted to the carrier demodulating part 203. The carrier demodulating part 203 is constructed as shown on the left side of the second level from the top of FIG. 7, for instance. The carrier demodulating part 203 operates as shown in FIG. 12.

When a sampling frequency at the time of the A/D conversion at the A/D converter 201 and a process frequency at the carrier demodulating part are referred to as "fs" and a carrier frequency of the reception IF signal is referred to as "fIF", fs is set so that an expression "fs=4*fIF/3" is established.

In such a case, the carrier frequency is undersampled and after the A/D conversion, as shown on the second level from the top of FIG. 12, a signal having a waveform whose carrier frequency is fs/4 is obtained. By repeatedly multiplying this A/D output signal by four values of "1, 1, −1, −1" (MOD data: third level from the top of FIG. 11) recorded in an MOD data table 2031 at a carrier MOD 2032, data shown on the fourth level from the top of FIG. 11 is obtained.

Figure 11:
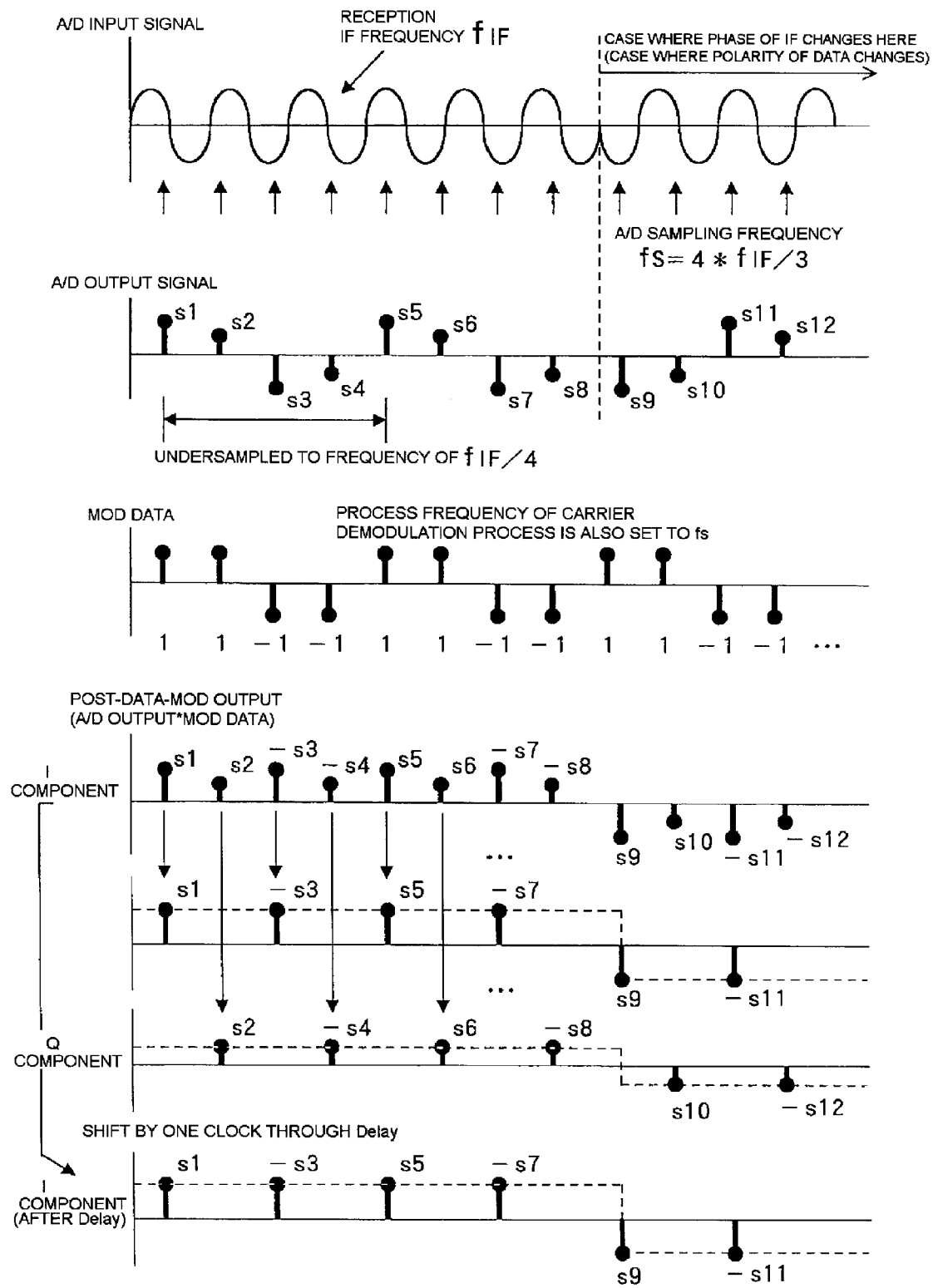
FIG. 11 is a diagram showing an overview of a correlation value detecting process in a correlation value detecting circuit.

At an I/Q component selector 2033, as shown on the fifth and sixth levels from the top of FIG. 11, the data is alternately split into an in-phase component (I component) and a quadrature component (Q component). One of those components is delayed by one process frequency, so a timing of the splitting is adjusted in accordance with an amount of the delay (lowermost level of FIG. 11).

By implementing such a carrier demodulation method, it becomes unnecessary to perform a complicated process such as multiplication of carrier data for harmonic elimination and a high-speed process for a digital filtering process at the master unit, and it becomes possible to realize a low current consumption operation.

The contents of the operation of the reception data decoding part 207 in the case where the high frequency radio apparatus operates as the slave unit are the same as those in the case where the high frequency radio apparatus operates as the master unit except for the frequency deviation detecting circuit 2072 described above. As a result, also when the high frequency radio apparatus is used as the slave unit, it becomes possible to reduce a gate scale and current consumption.

It should be noted here that it is preferable that the threshold value used in the correlation value judgment at the slave unit be set to be different from that at the master unit.

Effect of This Embodiment

In the communication system according to this embodiment, even when there is a deviation between the carrier frequencies of the master unit and the slave unit, it is possible to perform communication by controlling the carrier frequency of the master unit so as to adapt to that of the slave unit on the master unit side, so it becomes possible to simplify the construction on the slave unit side. Also, the master unit is capable of performing the carrier frequency deviation detection and correction in a wide range, so it is unnecessary for the high frequency radio apparatus operating as the slave unit to use expensive components such as TCXO and PLL in order to obtain a high-precision local oscillation frequency as in the case of a conventional type high frequency radio apparatus. Thus, it becomes possible to realize spread spectrum communication using an inexpensive local oscillator.

Further, in the communication system according to this embodiment, the carrier frequency deviation detection is performed by the FFT, so a high-precision detection process becomes possible with only a low-speed clock. Further, because frequency deviation can be detected at a frequency of a wide range, it is possible to realize reductions in current consumption and cost of the overall communication system.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

The invention claimed is:

1. A spread spectrum communication method using very weak power, in which one of a pair of high frequency radio apparatuses that communicate with each other through spread spectrum communication by use of the very weak power that is not a subject of regulation by law is set as a master unit and the other one of the pair is set as a slave unit, the spread spectrum communication method comprising the steps of:

transmitting, by the slave unit, a spread code B allocated to the slave unit to the master unit at an intermittent communication timing determined in advance;

detecting, by the master unit, a difference between a carrier frequency of the slave unit and a carrier frequency of the master unit by performing a frequency analysis of a signal component included in reception data when receiving the spread code B from the slave unit, correcting the carrier frequency of the master unit so that the detected difference is reduced, and transmitting, from the master unit, a spread code A to the slave unit at an intermittent communication timing determined based on a reception timing of the spread code B from the slave unit, wherein said spread code A is allocated to the master unit with the carrier whose frequency has been corrected; and judging, by each of the master unit and the slave unit, that there is a correlation when a correlation value level of the reception data at the time of reception of the spread code A and B respectively from the other one of the master unit and the slave unit is greater than a threshold value determined in advance, and establishing communication synchronization, wherein only the spread code A and B is exchanged until the communication synchronization is established between the master unit and the slave unit.

2. A spread spectrum communication method according to claim 1, wherein the frequency analysis comprises a fast Fourier transform process performed on data obtained by inversely spreading the spread code A and B.

3. A spread spectrum communication method according to claim 1, further comprising obtaining, by the master unit, until the synchronization is established between the master unit and the slave unit, carrier demodulated data by performing carrier demodulation on the reception data using a carrier before the correction, performing delay detection on the carrier demodulated data, and performing an inverse spread process based on the data that has been subjected to the delay detection and a predetermined differential code, and after the synchronization is established, stopping input of the differential code and skipping the delay detection before the inverse spread process.

4. A spread spectrum communication method according to any one of claims 1, 2, and 3, further comprising causing, by each of the master unit and the slave unit, a communication counterpart side to establish the communication synchronization by transmitting the spread code A and B respectively allocated to the own unit by only a section corresponding to one cycle.

5. A spread spectrum communication method according to claim 4, further comprising determining, by each of the master unit and the slave unit, after the communication synchronization is established, whether the reception data sent from the communication counterpart side is data only for synchronization holding or application data sent after the synchronization holding by maintaining a transmission section for performing transmission in a section corresponding to one cycle of the spread code A and B respectively, corresponds to the master unit and the slave unit, and maintaining a reception section for performing reception in a section corresponding to two cycles of the spread code A and B respectively, corresponds to the master unit and the slave unit, plus alpha, wherein alpha is a time required for the determination.

6. A spread spectrum communication method according to claim 5, further comprising detecting, by each of the master unit and the slave unit, a correlation value for each cycle of the spread code A and B respectively with respect to the reception data sent from the communication counterpart side, elongating, when the detected correlation value is higher than a predetermined value, the reception section by one cycle of the spread code A and B respectively, corresponds to the master unit and the slave unit, at a time based on the judgment that the reception data is the application data, and stopping the reception in the reception section in which a correlation with a previous cycle has become lower than the predetermined value.

7. A high frequency radio apparatus, comprising:
receiving means for receiving a signal having very weak power that is not a subject of regulation by law from a communication counterpart radio apparatus;
difference detecting means for detecting a difference of a carrier frequency of the own apparatus from a carrier frequency of the signal received by the receiving means;
carrier frequency correcting means for correcting the carrier frequency of the own apparatus so that the carrier frequency approaches the carrier frequency of the received signal based on the difference detected by the difference detecting means; and
transmitting means for transmitting predetermined transmission data to the communication counterpart radio apparatus with a carrier whose frequency has been corrected by the carrier frequency correcting means serving as a medium,
wherein the difference detecting means includes a synchronization timing detecting part for detecting a synchronization signal included in carrier demodulated data obtained by demodulating the received signal using default carrier data and detects the difference by analyzing a frequency component of the synchronization signal detected by the synchronization timing detecting part.

8. A high frequency radio apparatus according to claim 7, wherein the synchronization signal comprises a spread code that is unique to the communication counterpart radio apparatus, which is transmitted by only one cycle for synchronization establishment and synchronization holding.

9. A high frequency radio apparatus according to claim 8, wherein the synchronization timing detecting part selectively forms a first circuit for delay-detecting the carrier demodulated data and inversely spreading the delay-detected data using a differential code obtained through a delay detection process of a spread code allocated in advance for an inverse spread process, until synchronization is established between the high frequency radio apparatus and the communication counterpart radio apparatus, and a second circuit for inversely spreading the carrier demodulated data while skipping the delay detection, after the synchronization is established between the high frequency radio apparatus and the communication counterpart radio apparatus.

10. A high frequency radio apparatus according to claim 9, wherein the difference detecting means further includes:
a memory of a FIFO type for saving a part of the carrier demodulated data corresponding to a predetermined length during an operation of the synchronization establishment;
a control circuit for holding, when the reception data sent from the communication counterpart radio apparatus is detected by the synchronization timing detecting part, a part of the reception data in the memory;
an inverse spread process circuit for performing the inverse spread process on the held reception data; and
a detecting circuit for deriving a peak value of the data after subjecting the data that has undergone the inverse spread process by the inverse spread process circuit to a fast Fourier transform process, and detecting the difference in the data based on the derived peak value.

11. A high frequency radio apparatus according to claim 7, wherein the transmitting means includes:
a differential coding circuit for performing differential coding of the transmission data;
a spread modulating part for spread-modulating a spread code allocated to itself using the transmission data that has been subjected to the differential coding by the differential coding circuit;
a digital modulating circuit for digitally modulating the data spread-modulated by the spread modulating part; and
a D/A converting circuit for converting the digitally modulated data into analog data.

12. A high frequency radio apparatus according to claim 11, wherein the digital modulating circuit performs BPSK modulation.

13. A spread spectrum communication system using very weak power, comprising a pair of high frequency radio apparatuses that communicate with each other through spread spectrum communication by use of the very weak power that is not a subject of regulation by law, one of the pair being set as a master unit and the other one of the pair being set as a slave unit, wherein:
the slave unit includes communication means for transmitting a spread code B allocated to the slave unit to the master unit at an intermittent communication timing determined in advance, and waiting for a spread code A from the master unit;
the master unit includes:
detecting means for detecting a difference between a carrier frequency of the slave unit and a carrier frequency of the master unit by performing a frequency analysis of a signal component included in reception data when receiving the spread code B from the slave unit;
carrier frequency correcting means for correcting the carrier frequency of the master unit so that the difference detected by the detecting means is reduced; and
transmitting means for transmitting the spread code A allocated to the master unit to the slave unit at an intermittent communication timing determined based on a reception timing of the spread code B from the slave unit with a carrier whose frequency has been corrected by the carrier frequency correcting means serving as a medium; and
each of the master unit and the slave unit includes synchronization establishment means for judging, when a correlation value level of the reception data at the time of reception of the spread code from the other one of the master unit and the slave unit is greater than a threshold value determined in advance, that there is a correlation, and establishing communication synchronization.

* * * * *